Aug. 30, 1960 H. SCHMID 2,951,212

PULSE WIDTH MODULATORS

Filed Sept. 19, 1958 2 Sheets-Sheet 1

HERMANN SCHMID
INVENTOR

BY Richard G. Stephens

ATTORNEY

Aug. 30, 1960 H. SCHMID 2,951,212
PULSE WIDTH MODULATORS
Filed Sept. 19, 1958 2 Sheets-Sheet 2

HERMANN SCHMID
INVENTOR

BY Richard D. Stephens
ATTORNEY

United States Patent Office 2,951,212

Patented Aug. 30, 1960

2,951,212

PULSE WIDTH MODULATORS

Hermann Schmid, Binghamton, N.Y., assignor to General Precision, Inc., a corporation of Delaware Filed Sept. 19, 1958, Ser. No. 762,024

4 Claims. (Cl. 332—9)

This invention relates to pulse width modulation, and more specifically, to improved apparatus for providing output pulses having time-widths or durations commensurate with the value of an independent variable input signal. Pulse width modulators, which are often used in analog to digital converters, have wide application in the computer, automatic control, instrumentation and communication industries.

One embodiment of the present invention is disclosed but not claimed in my copending application Serial No. 693,298, filed October 20, 1957, for "Computer Multiplier," wherein it is used as part of an improved electronic time-division multiplier.

One possible application of the improved pulse width modulator is in a digital voltmeter. The output of the modulator may be connected to operate a conventional AND circuit which may control passage of clock pulses from a uniform frequency pulse source to a conventional pulse counter having a digital display. A voltage to be measured may be applied as the direct input voltage to the modulator loop, providing time modulation control of the AND circuit, so that the number of pulses counted in the counter during each cycle of the periodic voltage applied to the modulator will be a measure of the input voltage being measured. Other common uses of pulse width modulators arise in telemetry, wherein data relating to shaft positions, temperatures, flow rates and numerous other variables are transmitted. Any of these variables may be used to provide an input voltage for the pulse width modulator, and the output time-modulated pulses may be used to key transmitters and the like.

In prior art pulse width modulators with which I am familiar, extremely linear sweep voltages (such as sawtooth voltages) of constant peak amplitudes and a comparator which is absolutely free from drift are required if the modulator is to be linear. These requirements in turn require a highly stabilized power supply, expensive extremely linear components, and often temperature control of temperature sensitive components. The invention requires no extremely linear sawtooth voltages nor are stringent amplitude control requirements imposed on any periodic voltages. The invention utilizes all standard components, and temperature control is quite unnecessary for most applications of the invention.

Thus it will be seen that it is a primary object of the present invention to provide an improved pulse width modulator which is economical, simple and linear in operation.

It is a further object of the invention to provide an improved pulse width modulator of the type described which is stable and unaffected by changes in temperature and emissivity of transistors.

Other objects of the invention will in part be obvious and will in part appear hereinafter.

For a fuller understanding of the nature and objects of the invention reference should be had to the following detailed description taken in connection with the accompanying drawings, in which.

Figures 1, 4:
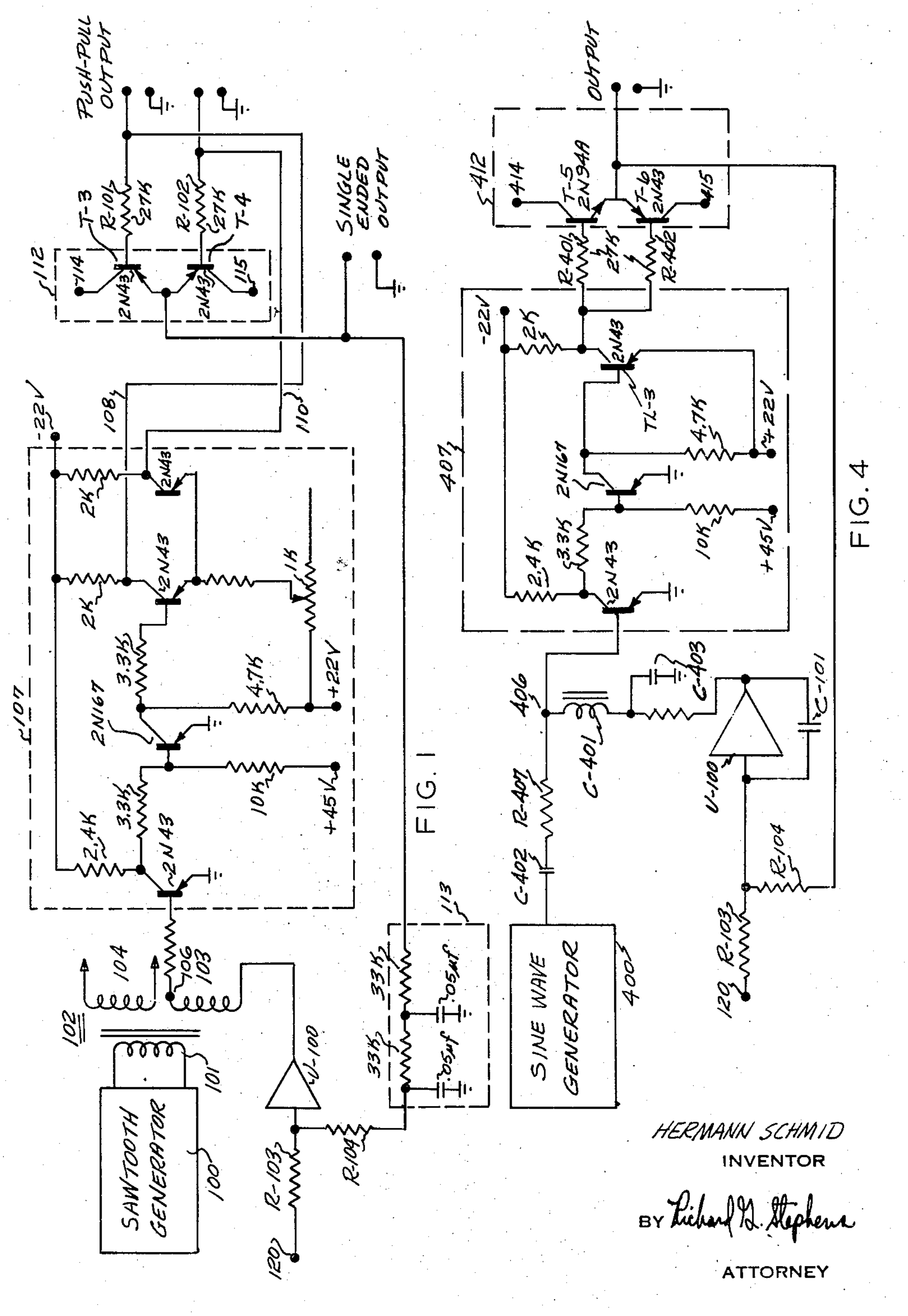
Fig. 1 is an electrical schematic diagram of an exemplary push-pull embodiment of the invention.
Fig. 4 is an electrical schematic diagram of an exemplary single-ended embodiment of the invention.

In Figs. 1 and 4 certain well-known electronic parts are shown in block form, and circuit values which are exemplary only have been shown.

Referring to the exemplary embodiment of Fig. 1, an oscillator or other source of periodic alternating voltage shown in block form as comprising a sawtooth generator 100 supplies an alternating voltage of fixed amplitude and fixed frequency to the primary winding 101 of transformer 102. Preferably a sawtooth voltage is supplied to winding 101, so that a sawtooth voltage is induced in each secondary winding of transformer 102. Assuming that conductor 105 lies at ground or zero potential, it will be recognized that the sawtooth voltage at terminal 106 of secondary winding 103 will have equal positive and negative excursions, being positive for precisely one half cycle and negative for precisely one half cycle. A plot of the voltage at terminal 106 under such conditions is shown as waveform #1 of Fig. 2. Only one oscillator or alternating voltage source need be supplied for a large number of modulators, and transformer 102 may be provided with a plurality of secondary windings to drive a plurality of modulators constructed in accordance with the invention. While Fig. 1 discloses a specific method of superimposing an alternating voltage and a direct voltage, various other means are well known and may be used without departing from the invention. One alternative will be explained in connection with Fig. 4.

Figure 2:
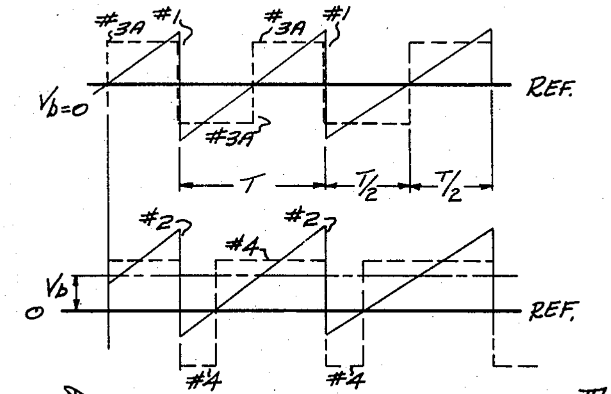
Fig. 2 is a group of waveforms useful in understanding the operation of the apparatus of Fig. 1.
Figure 5:
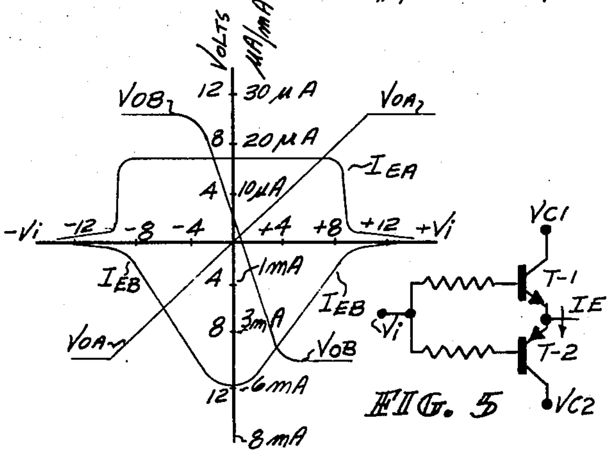
Fig. 5 is a graph useful in understanding the operation of the transistor switch portion of the apparatus of Fig. 4.

If a direct voltage potential exists on conductor 105, it will be seen to shift the mean or average level of the potential at terminal 106. If conductor 105 is positive with respect to ground, it will be seen that the alternating potential at terminal 106 will be positive with respect to ground for more than one half cycle and negative with respect to ground for less than one half cycle. A plot of such a voltage is shown as waveform #2 of Fig. 2. It should be apparent that existence of a negative voltage on conductor 105 will make terminal 106 be negative for more than one half cycle and positive for less than one half cycle. The alternating voltage at terminal 106 is applied to a limiter amplifier shown within dashed lines at 107. The function of limiter amplifier 107 is to convert the alternating voltage at terminal 106 into square wave or rectangular pulses. Limiter 107 is shown as comprising two grounded emitter amplifier stages and a push-pull or dual output stage. The limiter amplifier is over-driven, so that full positive output appears on conductor 108 whenever terminal 106 becomes slightly (about 20 millivolts) negative with respect to ground, and at the same time, to provide full negative output on conductor 110. Limiter 107 is shown as comprising a transistorized limiter amplifier but may comprise a conventional vacuum tube limiter amplifier, or a bi-stable circuit such as a Schmidt trigger without departing from the invention. Shown as waveform #3A of Fig. 2 is a plot of the voltage on conductor 108 when conductor 105 lies at ground potential, and it will be seen that the voltage consists of positive and negative pulses of equal time duration, each pulse having a duration of one half cycle. If a constant positive voltage exists on conductor 105, so that the alternating potential at terminal 106 varies as shown in waveform #2 of Fig. 2, the output voltage on conductor 110 will be positive for more than one half cycle as shown in waveform #4 of Fig. 2, and the output voltage on conductor 108 will be negative for more than one half cycle. If the sawtooth potential at terminal 106 is precisely linear, it should be apparent without further explanation that the increase in time duration of the positive pulses on conductor 108 and the increase in time duration of the negative pulses on conductor 110 will be directly proportional to the magnitude of the positive direct voltage existing on conductor 105. Conversely, if conductor 105 becomes negative with respect to ground, it will be seen that the resulting increase in time duration of negative pulses on conductor 108 and increase in time duration of positive pulses on conductor 110 will be directly proportional to the negative voltage on conductor 105, assuming again that a linear sawtooth voltage is induced in secondary winding 103. Thus it will be seen that the function of the sawtooth voltage and limiter 107 is to convert the direct voltage existing on conductor 105 into a pair of inverse or push-pull time-modulated signals. Since limiter amplifier 107 saturates whenever the voltage at terminal 106 slightly exceeds a few millivolts, the amplitudes of the positive and negative pulses on conductors 108 and 110 are determined by the power supply potentials applied to the limiter, and the amplitudes of the pulses remain constant throughout the pulse durations.

A direct voltage potential commensurate with an analog variable to be time-modulated is applied at terminal 120 via scaling resistor R–103 to the input circuit of a conventional D.C. amplifier U–100 shown in symbolic form. Neglecting for the moment the feedback connection through resistor R–104, and assuming that amplifier U–100 is linear, it will be seen that the potential on conductor 105 would vary in accordance with the analog variable, so that the pulses on conductors 108 and 110 would be time-modulated in accordance with the value of the variable, which may be termed the $y$ variable for convenience of explanation. The time-modulated pulses on conductors 108 and 110 are demodulated by a transistor switching circuit indicated generally at 112 and a filter shown within dashed lines at 113, providing a direct voltage feedback signal which is applied to amplifier U–100 via feedback scaling resistor R–104. Thus it may be seen that amplifier U–100 is connected in a closed loop circuit, and conventional feedback amplifier analysis will apply.

Designating the period of one sawtooth wave as T, the sawtooth amplitude as $V_s$, the period or width of a pulse on conductor 108 or conductor 110 as $t$, and the bias or offset voltage on conductor 105 as $V_b$, all as indicated in Fig. 2, the following relationship may be written:

$$t=\frac{T}{2}\frac{V_s+V_b}{V_s}$$

or $$\frac{t}{T}=\frac{1}{2}\left(1+\frac{V_b}{V_s}\right) \tag{1}$$

If stable and accurate reference voltages of magnitude $V_r$ and of opposite polarities are connected to terminals 114 and 115 of switching circuit 112, the amplitudes of the pulses applied to the switching circuit from conductors 108 and 110 will be limited very accurately to the values of the reference voltages, in a manner to be described below in greater detail. The demodulated or mean level value of the pulses applied to switching circuit 112 may be seen to be related to the filtered feedback voltage $V_f$ applied to amplifier U–100 in the following manner:

$$V_f=-V_r\left(1-2\frac{t}{T}\right) \tag{2}$$

Substituting $t/T$ as defined in Equation 1 into Equation 2:

$$V_f=-V_r\left[1-\frac{2}{2}\left(1+\frac{V_b}{V_s}\right)\right]=\frac{V_rV_b}{V_s} \tag{3}$$

The bias or offset voltage $V_b$ on conductor 105 may be seen to be proportional to the resultant input voltage applied to amplifier U–100 multiplied by the gain A of the amplifier. The resultant input voltage may be seen to be proportional to the sum of the independent variable input voltage $V_y$ applied at terminal 120 and the feedback voltage $V_f$ applied via resistor R–104. Therefore, if $V_f$ in Equation 3 is replaced by $V_rV_b/V_s$, $$V_b=(V_y+V_f)A=AV_y+\frac{AV_rV_b}{V_s} \tag{4}$$

$$V_b=\frac{AV_y}{1-\frac{AV_r}{V_s}} \tag{5}$$

Substituting the expression of Equation 5 for $V_b$ in Equation 1:

$$1-2\frac{t}{T}=1-\frac{2}{2}\left(1+\frac{V_b}{V_s}\right)=\frac{\frac{AV_y}{1-\frac{AV_r}{V_s}}}{V_s} \tag{6}$$

Multiplying through by $V_s$:

$$1-2\frac{t}{T}=\frac{AV_y}{V_s-AV_r} \tag{7}$$

By providing amplifier U–100 with sufficient gain, the quantity $AV_r$ can be made to be many times larger than $V_s$, so that Equation 7 may be written with negligible error as follows:

$$\left(1-2\frac{t}{T}\right)=\frac{V_y}{V_r}k \tag{8}$$

where $k$ is a scaling constant.

From Equation 8 it may be seen that the output time modulation $$\left(1-2\frac{t}{T}\right)$$

on conductors 108 and 110 is directly proportional to $V_y$, the independent variable analog input potential, and inversely proportional to $V_r$, the reference voltage applied to switching circuit 112. When the gain A of amplifier U–100 is high, the time modulation $$\left(1-2\frac{t}{T}\right)$$

will now be seen to be independent of the amplitude, linearity and frequency of the sawtooth wave, and hence it may be apparent now that the alternating voltage source 100 may be a sine wave source rather than a sawtooth wave source if desired. As in the case of conventional feedback amplifiers, the operation of the feedback circuit of Fig. 1 is determined largely by the component values of the fixed circuit elements used and is almost wholly independent from change due to ageing or temperature changes in the characteristics of the transistors used.

If constant reference voltages are applied to terminals 114 and 115, so that $V_r$ of Equation 8 is a constant, the time modulation will be seen to be dependent solely upon $V_y$, the applied potential representing the input analog independent variable. If the reference voltages applied at terminals 114 and 115 are made to vary in accordance with a second independent variable $z$, the circuit will function as a divider and provide time modulation such that the pulse widths vary in accordance with the ratio between the input variable applied at terminal 120 and the limiting variable applied to the collector electrodes of the transistor switching circuit. Operation as a divider modulator may be understood by comparison of the circuit of Fig. 1 with that of a conventional feedback amplifier division circuit, which need not be shown herein. Those skilled in the art realize that if the feedback voltage of a feedback amplifier is modified in accordance with an independent variable, that the amplifier operates to provide an output voltage which varies inversely with said variable. If the reference voltages at terminals 114 and 115 are made to increase in accordance with a $z$ variable, the widths of the pulses passing through switching circuit 112 will decrease correspondingly. As in conventional feedback amplifiers, use of a weak feedback signal, which occurs when the magnitudes of the potentials at terminals 114 and 115 become small, provide less accurate and less linear operation, so division by small values will provide more error than otherwise. In the exemplary practical embodiment shown the gain around the feedback loop was of the order several million for D.C., but of the order of 10,000 to 20,000 at about 10 cycles per second. In Fig. 1 it is shown that push-pull output may be derived from conductors 108 and 110, and that a single-ended output may be taken from the common emitter terminal. It may be noted that the single-ended output will be slightly more linear (i.e., vary more linearly with the input signal) than the push-pull outputs in the presence of any slight non-linearity in the transistor switch. Because high loop gain is used in the amplifier loop, and because the feedback impedance between the common emitter terminal and the input terminal of U–100 consists of linear elements, the output taken from the emitter terminal will be highly linear.

The time modulated pulses on conductors 108 and 110 are converted into the feedback signal mentioned above by a special transistor switching circuit shown at 112, which will now be explained in detail. Switching circuit 112 may be seen to comprise two emitter-to-emitter connected PNP transistors. The operation of this switching circuit is similar to that of an ideal single-pole double-throw switch.

Assume that time-modulated pulses having amplitudes of 10 volts are present on conductors 108 and 110. Also assume that constant potentials of plus and minus 6 volts are applied, respectively, to the collector electrodes of transistors T–4 and T–3 of switching circuit 112.

With −6 volts on the collector of T–3 and +6 volts on the collector of T–4, transistor T–3 functions as an emitter follower having T–4 as its load impedance duriny any time that the T–3 base drive voltage $V_A$ applied from conductor 108 and its inverse, the base T–4 drive voltage $V_B$ applied from conductor 110, are less in magnitude than the magnitude of the $z$ variable voltage (assumed to be 6 volts) on the transistor collector electrodes. Thus as the $V_A$ voltage rises from zero in a positive direction, the output voltage at the transistor emitter electrodes follow closely. Inasmuch as the pulses have almost vertical leading and trailing edges, it will be seen that operation of the transistor as an emitter follower occurs only for an extremely brief period.

As the $V_A$ voltage reaches and exceeds 6 volts, it will be seen that the collector-base junction of transistor T–3 becomes reverse biased, and the collector-base junction of transistor T–4 becomes forward biased. The emitter of T–4 is forward biased, with the result that transistor T–4 conducts, while the emitter of T–3 is reverse biased, cutting off T–3. With T–3 cut off and T–4 conducting, it will be seen that the output voltage at the emitters will be very nearly that of the $z$ variable voltage of +6 volts present at the collector electrode of transistor T–4. The output voltage will differ from 6 volts only by approximately one millivolt. As the base drive voltage $V_A$ continues upwardly at 10 volts and remains at 10 volts throughout the duration of the positive $V_A$ pulse, the output voltage at the emitters will remain at 6 volts. When the $V_A$ voltage starts down at the trailing edge of the pulse, the output voltage remains at 6 volts until $V_A$ reaches and begins to become less than 6 volts. The circuit then becomes an emitter follower again, and the output voltage swings with the $V_A$ base voltage from +6 volts through zero or ground toward −6 volts. As the $V_A$ pulse becomes more negative than −6 volts, it will be seen that the emitter and collector of T–3 each will be forward biased, causing T–3 to conduct, while the emitter and collector of T–4 each will be reverse-biased, and T–4 will be cut off. Now the output voltage at the emitters will be very nearly that of the $z$ variable voltage of −6 volts present at the collector electrode of transistor T–3. The output will remain at −6 volts as long as the negative $V_A$ base drive voltage exceeds −6 volts, the $z$-variable voltage magnitude, and at the end of the negative $V_A$ pulse the output voltage will swing positive, causing the above described emitter follower action to begin a new cycle.

Figure 3:
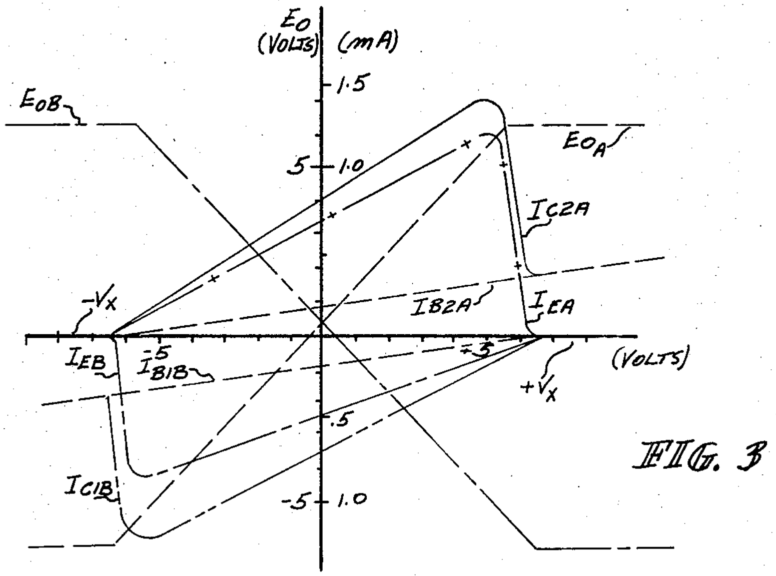
Fig. 3 is a graph useful in understanding the operation of a transistor switch portion of the apparatus of Fig. 1.

Typical characteristics of transistor switches of the types which may be utilized are shown in Fig. 3, wherein collector current $I_c$, emitter current $I_E$ and base current $I_B$ are shown plotted against base drive voltages. It should be noted that the currents each are very small when base drive voltage $V_A$ is larger than the applied collector voltage $V_x$. In the transition region during which one transistor acts as an emitter follower, collector current $I_c$ and emitter current $I_E$ increases from zero at one extreme to a maximum shortly before the opposite extreme, while base current $I_B$ increases proportionally with base drive voltage $V_A$.

A transistor characteristic which allows provision of an almost ideal switch is the fact that extremely small voltage drops exist between the emitter and collector of the conducting transistor, so that the emitter output voltage corresponds almost exactly to the voltage applied to the transistor collector, with only a drop of approximately one millivolt. In the preferred form of the invention, both transistors of each switch are connected in the grounded collector configuration shown. While such connection requires more power to control the switch, smaller voltage drops exist between collector and emitter of a conducting transistor.

For optimum operation of the time-division multiplier the transistor switches should be able to handle fairly large voltages, the voltage drop across the conducting branch of the switch should be as small as possible, and the switch should be capable of operation at high speeds. To satisfy these requirements, one should use transistors in which the rated collector-base voltages $V_{CB}$, the rated emitter-base voltages $V_{EB}$ and the rated punch-through voltage each are high. Since each of these breakdown voltages depend upon the external base resistance $R_B$, it would be desirable that $R_B$ be made as small as possible. However, it will be seen from Fig. 3 that since the peak emitter and collector currents which flow during the transition mode are determined by the amount of base current which flows in the emitter follower transistor, it may be desirable if $R_B$ is increased to decrease base current $I_B$, thereby to decrease peak emitter and collector currents. Such currents flow only during a portion of the cycle, and the greater the peak values of these currents, the greater the load placed on whatever voltage source is used to supply the analog variable voltages applied to the collector electrodes, causing ripple if such load is too great. Thus two opposite considerations affect selection of the optimum base resistance, and a compromise value may be chosen.

General Electric Company type 2N43 transistors have been used in one embodiment of the invention. The maximum collector base voltage $V_{CB}$ and the maximum collector-emitter voltage $V_{CE}$ for the transistors utilized were 45 volts and 20 volts, respectively. Measurements of $V_{EB}$ over a large range of base resistances for several dozen of these transistors indicated that the emitter breakdown voltages were in excess of 30 volts.

The collector-emitter voltage drop $V_{CE}$ has been determined in the prior art to be calculable as follows for a grounded emitter transistor:

$$V_{CE}=\frac{kt}{q}\ \text{In}\ \frac{\alpha I\left[1-\frac{I_c}{I_B}\frac{1-\alpha_N}{\alpha_N}\right]}{1+\frac{I_c}{I_B}(1-\alpha I)} \quad (9)$$

and as follows for a grounded collector transistor:

$$V_{CE}=\frac{kt}{q}\ \text{In}\ \frac{\alpha N\left[1-\frac{I_E}{I_B}\frac{1-\alpha_I}{\alpha_I}\right]}{1+\frac{I_E}{I_B}(1-\alpha_N)} \quad (10)$$

where $I_E$ is emitter current, $I_B$ is base current, $I_C$ is collector current, $kt/q$ is a constant of .026 volt at 25 degrees centigrade, $\alpha_N$ is the forward or normal current amplification factor, and $\alpha_I$ is the inverse current amplification factor. From Expression 9 it may be seen that as collector current approaches zero in a grounded emitter transistor, collector-emitter voltage drop becomes proportional to the logarithm of the inverse current amplification factor $\alpha_I$. From Expression 10 it may be seen that as emitter current approaches zero in a grounded collector transistor, that collector-emitter voltage drop becomes proportional to the logarithm of the forward or normal current amplification factor $\alpha_N$. Since collector junction area exceeds emitter junction area in conventional unsymmetrical transistors, the forward amplification factor $\alpha_N$ is greater than the inverse amplification factor $\alpha_I$ in such transistors, and use of a grounded collector circuit will be seen to provide a smaller voltage drop $V_{CE}$ across the switch. Using type 2N43 transistors connected as shown in Fig. 1, the voltage drops across the switches measured less than 1 millivolt over a switching voltage range of ±10 volts. While symmetrical switching transistors may be used without departing from the invention, the greater forward amplification factor $\alpha_N$ of currently available unsymmetrical transistors provides lower voltage drops than those provided with currently available symmetric switching transistors, which have a lesser maximum amplification factor.

It is quite desirable that each transistor switch have high enough frequency response to avoid unwarranted distortion of the rectangular base drive voltages applied to it, and it is desirable that the cut-off frequency of each transistor be of the order of 100 times that of the modulation frequency. An embodiment of the invention utilizing type 2N43 transistors was tested with a multiplier modulation frequency of 1000 cycles. Since the alpha cutoff frequency of such transistors is of the order of one megacycle, no appreciable deterioration of the applied square waves was detected. It should be obvious to those skilled in the art at this point that NPN transistors may be substituted into the switching circuit 112 of Fig. 1 with appropriate change in polarities, i.e., interchanging terminals 108 and 110 or 114 and 115. The use of higher frequency transistors, such as 2N426, 2N316, etc. will permit carrier wave forms of a higher frequency, such as 10 kilocycles. It should be apparent at this point that blocking amplifier 107 should produce output pulses which equal or slightly exceed the voltages to be applied to the collector electrodes of the transistor switch. The operating range of the modulator varies from the condition where the output voltage of amplifier U–100 just equals the positive peak amplitude of the input periodic voltage in coil 103 to the opposite extreme, where the output voltage just equals the negative peak. Increasing the input voltage beyond these limits has no effect, and no modulation will be accomplished. Increasing the amplitude of the sawtooth input voltage at terminal 106 will be seen to improve the operation by making the leading and trailing edges of the rectangular pulses steeper for a given amount of gain in amplifier 107. The maximum allowable amplitude of the sawtooth is determined, of course, by the maximum output voltage excursion of which amplifier U–100 is capable.

Fig. 4 illustrates an alternative single-ended embodiment of the invention. Most of the operation of the device of Fig. 4 will become apparent from comparison with Fig. 1 described above. The chief differences in Fig. 4 are that the squaring amplifier is single-ended rather than push-pull, and that switching circuit 112 is modified. Rectangular pulses similar to those shown in Fig. 2 appear at the collector electrode of transistor TL–3. These pulses are applied through resistors R–401 and R–402 to the base electrodes of transistors T–5 and T–6. For purposes of explanation, assume that the rectangular pulses make positive and negative excursions of plus and minus 15 volts, and that positive and negative constant voltages of 10 volts are applied to the collector electrodes of transistors T–5 and T–6. With +10 volts on the collector of T–5 and −10 volts on the collector of T–6, transistor T–5 functions as an emitter follower having T–6 as its load impedance during any time that the base drive voltage applied from conductor 408 is less in magnitude than the magnitude of the constant voltage (assumed to be 10 volts), present on the collector electrodes but positive with respect to the reference potential, ground. Thus as the base drive voltage rises from zero in a positive direction, the output voltage at the transistor emitter electrodes follows closely. Inasmuch as the pulses have almost vertical leading and trailing edges, operation of the transistor as an emitter follower occurs for only an extremely brief period.

As the base drive voltage reaches and exceeds 10 volts, it will be seen that the collector-base and emitter-base junctions of transistor T–6 become reverse-biased, and the collector-base and emitter-base junctions of transistor T–5 become forward-biased. Therefore transistor T–5 conducts, while T–6 is cutoff. With transistor T–6 cut-off and transistor T–5 conducting, it will be seen that the output voltage at the emitters will be very nearly that of the constant voltage of +10 volts present at the transistor T–5 collector electrode. The output voltage will differ from +10 volts only by approximately one millivolt. As the base drive voltage continues upwardly to 15 volts and remains at 15 volts throughout the duration of the positive pulse, the output voltage at the emitters will remain at ten volts. When the base drive voltage starts down the trailing edge of the pulse, the output voltage remains at ten volts until the base drive reaches and begins to become less than 10 volts. The circuit then becomes an emitter follower again, and the output voltage swings with the base voltage from +10 volts through zero or ground toward −10 volts. When the base drive voltage goes negative, transistor T–6 functions as the emitter follower and T–5 as the load impedance. As the base drive pulse becomes more negative than −10 volts, it will be seen that the emitter-base and collector-base junctions of T–6 will be forward-biased, causing T–6 to conduct, while the emitter-base and collector-base junctions of T–5 will be reverse-biased, and T–5 will be cut off. Now the output voltage at the emitters will be very nearly that of the −10 volts present at the transistor T–6 collector electrode. The output will remain at −10 volts as long as the negative base drive voltage exceeds ten volts.

Typical characteristics of transistor switches of the type utilized at 412 are shown in Fig. 3, wherein emitter current $I_E$ is shown plotted against base drive voltages. It should be noted that the current is almost zero when the base drive voltage exceeds the applied collector voltage. In the transition region where one transistor acts as an emitter follower, collector current $I_c$ and emitter current $I_E$ increase from zero at one extreme to a maximum shortly before the opposite extreme, while base current $I_B$ increases proportionally with base drive voltage.

While Fig. 1 shows a sawtooth generator 100 as a source of periodic modulating voltage and Fig. 4 shows a sine wave generator, either source may be used with either embodiment of the invention, as will be clear from the foregoing feedback amplifier analysis. Fig. 4 also differs from Fig. 1 in that the filter means shown at 113 in Fig. 1 has been replaced in Fig. 4 by a capacitor C–101 connected across amplifier U–100, providing equivalent filtering. Fig. 4 also illustrates an alternative circuit for superimposing the output potential of the periodic potential source and the output potential of amplifier U–100. In Fig. 4 the periodic voltage from source 400 is applied through resistor R–407 and coupling capacitor C–402 to terminal 406, while the output voltage from amplifier U–100 is applied to terminal 406 via choke L–401 and scaling resistor R–408. The potential applied to the squaring amplifier 407 will comprise a composite voltage consisting of the periodic wave biased with respect to the reference potential (ground) in accordance with the output of amplifier U–100. Capacitor C–402 serves as a blocking capacitor to keep the direct current output of amplifier U–100 out of the output circuit of source 400, and choke L–401 and capacitor C–403 isolate the periodic potential of source 400 from the output stage of amplifier U–100. Choke L–401 and capacitor C–403 also provide further filtering. If the output stage of source 400 has other blocking means, C–402 is, of course, unnecessary, and if amplifier U–100 is provided with a high impedance output circuit, choke L–401 will not be needed.

With −10 volts applied to the collector of T–5 and +10 volts at the collector of T–6 (i.e., the $x$-variable is altered in sign from the previous case), operation of the transistor switch may be understood by visualizing the switch as comprising one transistor connected as an amplifier but with the collector and emitter electrodes interchanged with the other transistor acting as a load impedance. If the two transistors were completely identical in their electrical characteristics, T–5 would operate as an inverted amplifier and T–6 as load, when $V_1$ is positive with respect to ground, because T–5 base current and thus T–5 collector current are larger than those of T–6. Similarly, T–6 would operate as an inverted amplifier and T–5 as a load when $V_1$ is negative with respect to ground. Since it will almost never occur that two transistors have precisely identical electrical characteristics, the cross-over point, i.e., the point where the transistors change their functions, will occur when $I_{c1}=I_{c2}$. In the previous case ($V_{x1}=+10$ v., $V_{x2}=-10$ v.) a transistor saturates when the voltage on the base $V_1$ was larger than the collector potentials. In this case the transistors saturate when the base current in the transistor functioning as an inverted amplifier reaches a certain amount. The voltage $V_1$, for which this saturation occurs, thus varies between different transistors, just as the inverse multiplication factor ($\alpha_I$), varies. All of this operation occurs only in the transition region (i.e., when the rectangular pulses change from positive to negative and vice versa), in less than one microsecond in most practical embodiments of the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A linear pulse width modulator for providing output pulses having time widths which are linearly proportional to the value of a direct applied input potential, comprising in combination, potential difference-determining means responsive to said input potential and to a direct feedback potential for providing an amplified output potential commensurate with their difference, means for providing a periodic input voltage which alternates above and below a reference level, potential combining means for combining said amplified direct output potential and said alternating input voltage to provide a composite potential, means for sensing the instantaneous polarity of said composite potential with respect to said reference level and for providing an amplified first or second switching potential at an output terminal depending upon said polarity; a transistor switch comprising two transistors, each of said transistors having base, emitter and collector electrodes, means for applying a pair of opposite-polarity equal amplitude direct voltages to said collector electrodes, circuit means connecting said switching potentials to said base electrodes, said emitter electrodes being interconnected to provide said output terminal, and pulse-integrating means connected to said output terminal to provide said feedback potential.

2. A linear pulse width modulator for providing output pulses at a selected frequency which have time durations linearly proportional to the value of an independent variable, comprising in combination; means for deriving a direct input potential commensurate with said value of said variable; potential comparing amplifier means responsive to said input potential and to a feedback potential for providing a second potential commensurate in magnitude with their difference; means for providing a periodic input voltage which alternates above and below a reference level at said frequency; potential combining means for superimposing said second potential and said periodic input voltage to provide a composite potential; means for sensing the instantaneous polarity of said composite potential with respect to said reference level and for providing amplified first and second switching potentials at at least one further terminal depending upon said polarity; circuit means for limiting said switching potentials to positive and negative excursions of equal amplitude above and below said reference level to provide a third potential having a substantially rectangular waveform, and a filter circuit connected to filter said third potential to provide said feedback potential.

3. Apparatus according to claim 2 in which said circuit means for limiting said switching potentials comprises a pair of transistors of like conductivity type, each of said transistors having a base, an emitter and a collector electrode, said switching potentials comprising a pair of inversely-related rectangular waveform potentials connected to be applied individually to the base electrodes of said transistors, and means for applying a pair of equal voltages of opposite polarity to said collector electrodes of said transistors, said emitter terminals of said transistors being connected together to provide said third potential.

4. Apparatus according to claim 2 in which said circuit means for limiting said switching potentials comprises a pair of transistors of opposite conductivity types, each of said transistors having a base, an emitter and a collector electrode, said switching potentials being applied to said base electrodes, and means for applying a pair of equal voltages of opposite polarity to said collector electrodes of said transistors, said emitter terminals of said transistors being connected together to provide said third potential.

References Cited in the file of this patent

UNITED STATES PATENTS

| | | |
|---|---|---|
| 2,539,623 | Heising | Jan. 30, 1951 |
| 2,745,063 | De Jager | May 8, 1956 |
| 2,817,061 | Bowers | Dec. 17, 1957 |
| 2,849,614 | Royer et al. | Aug. 26, 1958 |

OTHER REFERENCES

Laboratory Equipment for Quantizing Speech by Allen Electronic Engineering, February 1956, pp. 48 to 52.